United States Patent
Rinckes (10) Patent No.: US 8,806,385 B1
(45) Date of Patent: Aug. 12, 2014

(54) METHOD AND APPARATUS FOR ENTERING A DATA RANGE

(75) Inventor: Douglas Rinckes, Thalwil (CH)

(73) Assignee: Google Inc., Mountain View, CA (US)

( * ) Notice: Subject to any disclaimer, the term of this patent is extended or adjusted under 35 U.S.C. 154(b) by 72 days.

(21) Appl. No.: 13/304,992

(22) Filed: Nov. 28, 2011

(51) Int. Cl.
*G06F 3/14* (2006.01)
*G06F 3/041* (2006.01)
*G09G 5/22* (2006.01)

(52) U.S. Cl.
USPC ............... 715/864; 345/173; 345/440.2

(58) Field of Classification Search
CPC . G06Q 10/1093; G06Q 10/109; G06Q 10/10; G06F 3/0488; G06F 3/04847
USPC ........................... 700/100; 715/864
See application file for complete search history.

(56) References Cited

U.S. PATENT DOCUMENTS

| | | | |
|---|---|---|---|
| 5,247,284 A | 9/1993 | Fleming | |
| 5,247,438 A | 9/1993 | Subas et al. | |
| 5,805,444 A * | 9/1998 | Seymour | 700/16 |
| 5,860,067 A | 1/1999 | Onda et al. | |
| 5,959,615 A | 9/1999 | Yamade et al. | |
| 6,104,788 A | 8/2000 | Shaffer et al. | |
| 6,388,952 B2 | 5/2002 | Kim | |
| 6,614,450 B1 | 9/2003 | Vossler | |
| 6,782,550 B1 | 8/2004 | Cao | |
| 7,313,767 B2 | 12/2007 | Mak | |
| 7,827,490 B2 | 11/2010 | Kapur et al. | |
| 2009/0199124 A1 | 8/2009 | Birch | |
| 2009/0222730 A1 | 9/2009 | Wixson et al. | |
| 2010/0217418 A1 * | 8/2010 | Fontanot | 700/100 |

OTHER PUBLICATIONS

Nitrodesk, "TouchDown Screenshots", Oct. 7, 2010. http://wayback.archive.org/web/20101007101429/http://www.nitrodesk.com/screenshots.aspx.*
Office Action from U.S. Appl. No. 13/402,181, dated Nov. 21, 2013, 29 pps.
Response to Office Action from U.S. Appl. No. 13/402,181, dated Nov. 21, 2013, filed Feb. 18, 2014, 14 pps.
Apple Insider, "Inside Apple's iOS 5: Calendar improvements help make iPhone, iPad PC-free", Jun. 8, 2011 [online]. Retrieved from the Internet: <http://appleinsider.com/articles/11/06/08/inside_apples_ios_5_calendar_improvements_help_make_iphone_ipad_pc_free> 7 pps.
CalenGoo, "Easy access to your Google Calendar with your iPhone, iPod Touch and iPad", Jan. 5, 2013 [online]. Retrieved from the Internet: <http://calengoo.dgunia.de/Start.html> 4 pps.

(Continued)

*Primary Examiner* — Kee M Tung
*Assistant Examiner* — Nicholas R Wilson
(74) *Attorney, Agent, or Firm* — Shumaker & Sieffert, P.A.

(57) ABSTRACT

Disclosed are methods and systems for receiving the input of parameter ranges for computer applications, adapted to the use of small screen input devices. In one embodiment, a method is disclosed for accepting a time range into a computing device equipped with a touchscreen by entering a pair of time markers. The method includes displaying on the touchscreen a time bar having a start pad and a stop region. The device receives a first input starting at the start pad and ending at a first location on the time bar and receives a second input starting at the stop region and ending at a second location. The device displays time markers at the first and second locations. The device identifies first and second times corresponding to the first and second locations. The device identifies and displays a time range based on the first and second times.

20 Claims, 7 Drawing Sheets

(56) References Cited

OTHER PUBLICATIONS iOSnoops, "miCal—missing Calendar by entwicklungsschmiede UG & Co KG", Jan. 6, 2012 [online]. Retrieved from the Internet: <http://www.iosnoops.com/appinfo/mical-missing-calendar-for-iphone/392290576> 3 pps.

Response to Final Office Action dated Mar. 25, 2014 from U.S. Appl. No. 13/402,181, filed May 6, 2014, 12 pp.

Office Action from U.S. Appl. No. 13/402,181, dated Mar. 25, 2014, 18 pp.

* cited by examiner

METHOD AND APPARATUS FOR ENTERING A DATA RANGE

RELATED APPLICATIONS

This application is related to co-pending application Ser. No. 13/402,181 filed Feb. 22, 2012 and entitled "GRAPHICAL METHOD OF INPUTTING PARAMETER RANGES" and Application Ser. No. 61/601,735 filed Feb. 22, 2012 and entitled "SELECTING PARAMETER RANGES."

TECHNICAL FIELD

The disclosure relates generally to the field of graphical computer interfaces including, for example, methods of receiving the input of parameter ranges on small screen devices.

BACKGROUND

Some computer applications require entering of parameter ranges, for example, the opening hours of a shop or the time and duration of a meeting. One common method for entering these ranges is by the use of text. For example, applications can provide text input fields for the opening time and the closing time of the shop. Other applications, for example project management programs and personal scheduling programs, support the entry of time ranges graphically. These programs typically provide a time grid for the entry of time ranges. The grids typically have a time scale across the top and multiple rows underneath the time scale, to allow for the entry of individual time ranges, with a row dedicated to each time range.

With the advent of mobile devices equipped with display screens, applications have been developed to adapt the display of parameter ranges to the small screens on mobile devices. For example, applications have been developed to display time ranges in a bar format, with light and dark areas, indicating times when a person does and does not have an appointment.

Although display formats have been adapted to the use of the smaller screens on mobile and other handheld devices, current methods for entering parameter ranges in existing applications are not well suited for devices with small displays generally, and in some cases for the touch sensitive display screens used in these devices.

SUMMARY

Disclosed are embodiments of methods and apparatuses for receiving the input of parameter ranges for computer applications.

One aspect of the disclosed embodiments is a method for accepting user input of at least one time range into a computing device equipped with a touchscreen. The method includes displaying a time bar on the touchscreen. The time bar has a start region, a stop region, and a spatial range between the start region and the stop region. The computing device receives a first touch-and-slide input that begins at the start region and ends at a first location in the spatial range. The computing device displays a first time marker at the first location. It receives a second touch-and-slide input that begins at the stop region and ends at a second location in the spatial range. The computing device displays a second time marker at the second location. A first time based on the position of the first location is identified along with a second time based on the position of the second location. The computing device identifies at least one time range that includes the first time and the second time.

Another aspect of the disclosed embodiments is a method for accepting user input of at least one time range into a computing device having a touchscreen. The method includes displaying a time bar on the touchscreen. The time bar has a start region, a stop region and a spatial range between the start region and the stop region. The spatial range corresponds to a temporal range and is displayed in a base color. The computing device receives a first touch-and-slide input that begins on the start region and ends at a first location in the spatial range. The computing device displays a first time marker on the touchscreen at or near the first location. It receives a second touch-and-slide input that begins at the stop region and ends at a second location in the spatial range. The computing device displays a second time marker at or near the second location. A first time based on the position of the first location is identified along with a second time based on the position of the second location, where the first time precedes the second time. The computing device displays the first and second times at or near the first and second locations respectively. The computing device identifies at least one time range that includes the first time and the second time.

Another aspect of the disclosed embodiments is an apparatus for inputting at least one time range. The apparatus includes a touchscreen, and a processor in communication with the touchscreen. The device is operable to display on the touchscreen a time bar having a start region, a stop region and a spatial range between the start region and the stop region. The device receives a first touch-and-slide input on the touchscreen starting at the start region and ending at a first location in the spatial range. The device displays on the touchscreen a first time marker at or near the first location. The device receives on the touchscreen a second touch-and-slide input starting at the stop region and ending at a second location in the spatial range. It displays on the touchscreen a second time marker at or near the second location. The device identifies a first time based on the position of the first location along with a second time based on the position of the second location. The computing device identifies at least one time range including the first time and the second time.

BRIEF DESCRIPTION OF THE DRAWINGS

The various features, advantages and other uses of the present apparatus will become more apparent by referring to the following detailed description and drawings in which.

DETAILED DESCRIPTION

The disclosure herein is directed to apparatus and methods for receiving graphical input of parameter ranges for computer applications including those running on small screen Time is a common parameter for which a range of values are input to a computer application. The description below addresses entering time ranges into computer applications. The methods and apparatuses disclosed, however, can be used generally to enter any other type of parameter ranges.

Figure 1:
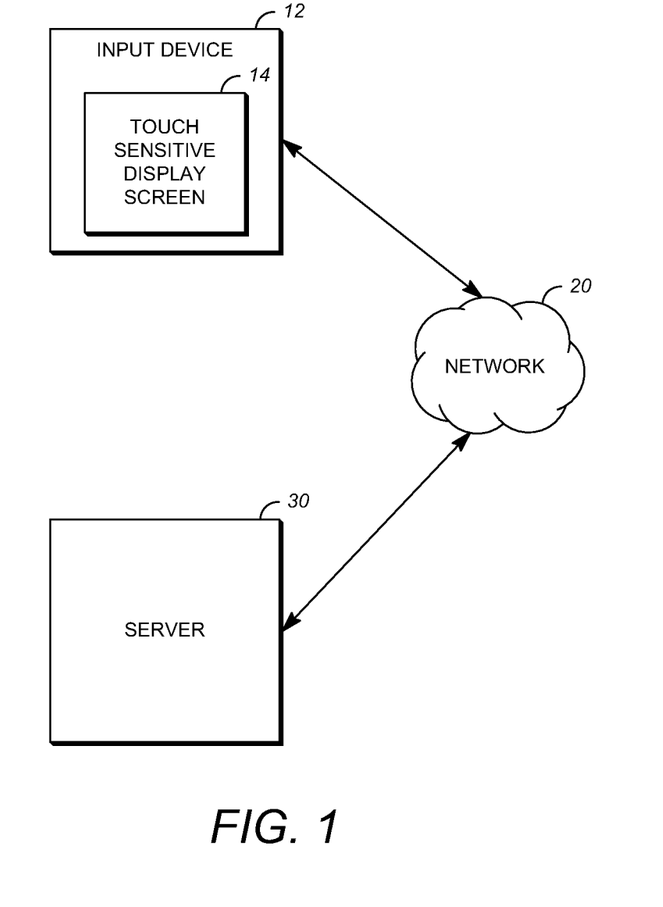
FIG. 1 is a block diagram of a system for inputting time ranges to computer applications.

FIG. 1 is a block diagram of a system for receiving parameter ranges as inputs to computer applications. An input device 12 is connected to a server 30 via a network 20. Device 12 is a computer with a processor operable to receive graphical input; however device 12 can any other type of computing device such as a mobile telephone, PDA, laptop or tablet PC, desktop computer, server, workstation, minicomputer or mainframe computer. As used herein, the terms "computing device" and "processor" mean any device or system (including a system of multiple processors operating in parallel) of any kind (including devices with multiple central processing units) that is capable of processing a signal or other information. Examples of processors and devices that incorporate processors include, without limitation, an application specific integrated circuit (ASIC), a programmable logic array (PLA), a computer, a server, a mobile telephone, a microcontroller, a digital logic controller, and a digital signal processor (DSP). The term processor can refer to a single processor or multiple processors, and encompasses all devices when configured to perform in accordance with the disclosed embodiments.

As an example, the device 12 can include memory such as RAM and ROM. A storage device can be provided in the form of any suitable computer readable medium, such as a non-volatile memory device or hard disk drive. The touch sensitive display screen 14, the processor, the RAM, the ROM, and the storage device are all connected by a bus.

Device 12 is operable to receive graphical input from a user and exchange data with the server 30 via network 20. In one embodiment, device 12 can receive input data from a touch sensitive display screen 14. For example, the screen 14 can receive input in the form of a touch from a finger or a stylus or any similar object. Device 12 can also receive data from other types of graphical input devices. For example, device 12 can receive graphical input data from a track ball, a touch pad or a mouse. Any type of device capable of providing graphical input data to the device 12 can be used to provide graphical input data. One exemplary implementation of input device 12 is described in detail below.

Device 12 and the server 30 are connected for communication with one another by a network 20. The communication functions described herein can be accomplished using any kind of network or communications means capable of transmitting data or signals. Suitable examples include the internet, which is a packet-switched network, a local area network (LAN), wide area network (WAN), virtual private network (VPN), or any other means of transferring data. A single network or multiple networks that are connected to one another can be used. It is specifically contemplated that multiple networks of varying types can be connected together and utilized to facilitate the communications contemplated by the systems and elements described in this disclosure.

The server 30 is operable to implement computer applications and may represent any type of computer, computer system or other programmable device, including a client computer, a server computer, a portable computer, an embedded controller, a PC-based server, a minicomputer, a midrange computer, a mainframe computer, and other computers adapted to support the methods and apparatus of this invention. One exemplary implementation of a server is described in detail below.

The computer applications that utilize the time range inputs can be installed on the server 30, or on the device 12. The computer applications that utilize the time range inputs can also be distributed such that a portion of one or more of the applications is implemented on the server 30 and another portion of the application is implemented on the device 12.

The device 12 is operable to output time ranges to one or more applications on the device 12 and to receive data from the applications for use in implementing the time range input function. The device 12 is also operable to output the time ranges to one or more applications installed on the server 30 via the network 20 and to receive data from the server 30 via the network for implementing the time range input function.

All or a portion of the embodiments of the present invention can take the form of a computer program product accessible from, for example, a computer-usable or computer-readable storage medium. A computer-usable or computer-readable storage medium can be any device that can, for example, tangibly contain, store, communicate, or transport the program for use by or in connection with any processor. The medium can be, for example, an electronic, magnetic, optical, electromagnetic, or semiconductor device or signal. Other suitable mediums are also available.

Figure 2A:
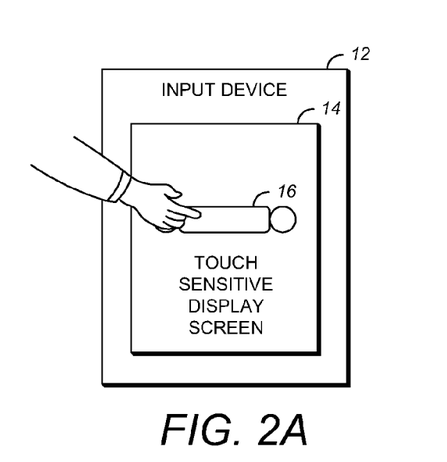
FIG. 2A is a perspective view of the input device used in FIG. 1.

FIG. 2A is a perspective view of the input device 12 used in FIG. 1. FIG. 2A illustrates a user inputting data on the input device 12 wherein the input device 12 uses a touch sensitive display screen 14 to implement a time entry interface 16. As described in detail below, the user enters time ranges by touching the touch sensitive display screen 14. The user can use a finger or a stylus or other similar device to touch the screen 14. As discussed above, the user can also interface with the device 12 using other types of graphical input devices.

Time Entry Interface

Figure 2B:
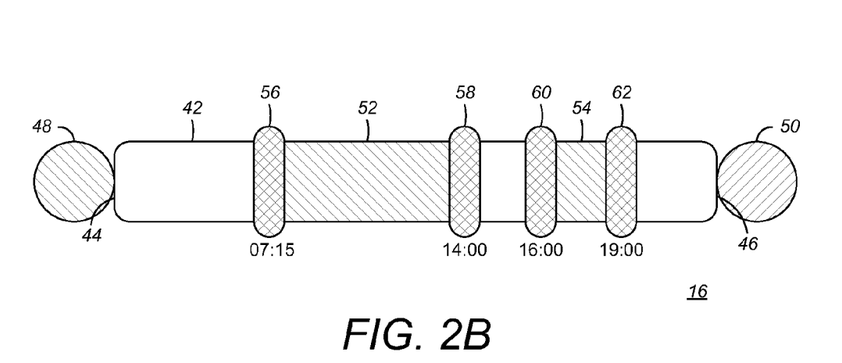
FIG. 2B is a detailed drawing of the time entry interface used by the input device of FIG. 2A.

FIG. 2B illustrates the time entry interface 16. The interface 16 includes a time bar 42. The time bar 42 is shown as an elongated rectangle oriented horizontally on the display screen 14. The time bar can be any other suitable shape such as a square, a circle or the circumference of a circle. It can also be oriented vertically, diagonally or at any other angle on the display screen 14. The time bar 42 presents a graphic representation of a 24 hour day, with the left end 44 representing 00:00 and the right end 46 representing 24:00. The time bar 42 can be used for any other range of time such as an hour, twelve hours, a week, a month or a year. The time bar 42 includes a start region 48 adjacent to the left end 44 and a stop region 50 adjacent to the right end 46. The start and stop regions are displayed as circles, but can be any other suitable shape.

In this case, the time entry interface 16 displays two user selected time ranges, 52 and 54. The first time range 52 is defined by a first time marker 56 and a second time marker 58, defining respectively the beginning and end of the first time range 52.

The time range 52 can be displayed in a color that differs from the background of the time bar 42. Likewise, the time markers 56 and 58 can be shown in different colors to distinguish them from the time bar 42 and the time range 52. The second time range 54 is defined by a third time marker 60 and a fourth time marker 62. The time entry interface 16 further displays indicia 64(a)-(d), each associated with a marker, with 64(a) associated with marker 56, 64(b) associated with marker 58, 64(c) associated with marker 60 and 64(d) associated with marker 62. Each indicia 64(a)-(d) displays the time corresponding to the associated marker.

Entering Markers

FIGS. 3A-3G illustrate the procedure for entering the first time range 52 and the second time range 54 in one embodiment. Generally, time ranges are entered by selecting a first time defining the start of the time range and selecting a second time defining the end of the time range. The method of this embodiment describes the first time being the start of the first time range 52 and the second time being the end of the time range 52, but other implementations are possible wherein the first time and second time are interchangeable. The times are selected by graphically selecting a location on the time bar 42 corresponding to the desired time as will be described in detail below. Each location on the time bar 42 corresponds to a particular time. When the description below refers to selecting a location on the time bar, it is referring more specifically to selecting a location on the time bar corresponding to a time.

Figure 3A:
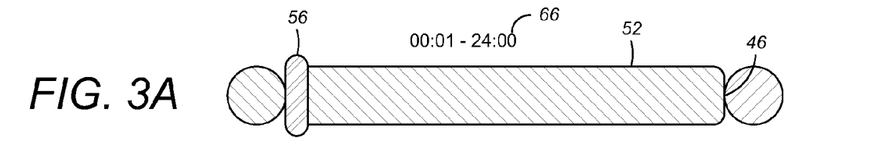
FIGS. 3A-3G are displays used by the input device of FIG. 2A for entering time ranges.

The user initiates the entry of the first time range 52 by entering a first time. The user enters the first time by touching on the start region 48 and sliding to the desired location on the time bar 42. For convenience, this type of input is referred to as a "touch-and-slide" input. The term "touch-and-slide" encompasses any type of drag-and-drop or other gesture or input command in which a cursor, mouse pointer or other selection device is placed onto a given location on the screen and then moved to another location with the effect of selecting and moving an object. The touch-and-slide input refers to both the original entry of a marker on a start region 48 or stop region 50, and to selecting a previously entered marker that has previously been placed on the time bar 42. For example, a touch-and-slide input can be implemented by using a mouse. The mouse is manipulated by the user to position a mouse pointer over the object and thus selecting the object. The user then left clicks the mouse and holding the left click-button down to select the object, slides the mouse to input a command or command(s) to cause the object to be repositioned on the display to a desired location. At the desired location, the user unselects the object by releasing the left click on the mouse. In other embodiments in which a touch-screen is implemented, the user can effect a touch-and-slide input by physically touching the screen at the position where the object is displayed with a finger or stylus to select the object and then (while maintaining the finger or other stylus on the screen) sliding the finger or stylus pointer across the screen to move the object to a desired location. The user unselects the object by discontinuing the touch on the screen. Other touch-and-slide gestures or techniques whether now existing or hereinafter developed can used to practice the disclosed subject matter.

Figure 3B:
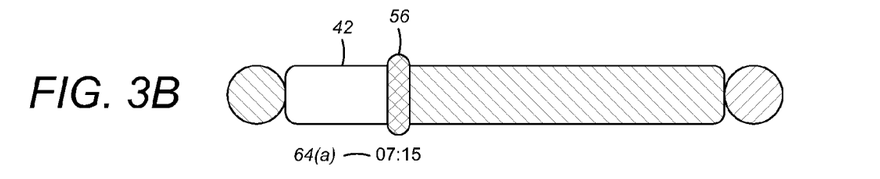

When the user initially touches the start region 48, the device 12 displays the first time marker 56 as shown in FIG. 3A. The input device 12 further displays the first time range 52 on the time bar 42. When the user initially touches the start region 48, the device 12 displays the first time marker 56 and the first time range 52 on the time bar 42, extending from the marker 56 to the right end 46 of the time bar 42. The input device 12 displays a time range display 66 above the time bar 42. The time range display 66 displays the first time range 52 numerically. As the user slides to the desired location, the device 12 displays the marker 56 tracking the slide input and the time range 52 contracting. The device 12 periodically updates the time range display 66. When the user reaches the desired location, the user places the marker 56 by releasing the touch. The device 12 displays the marker 56 in a different color to indicate that the marker 56 is placed. The device 12 removes the time display 66 from the interface 16. The device 12 displays the time indicia 64(*a*) below the marker 56 to show the first time. In this case, the user has selected the first time of 7:15. The interface 16 appears as shown in FIG. 3B.

Figure 3C:
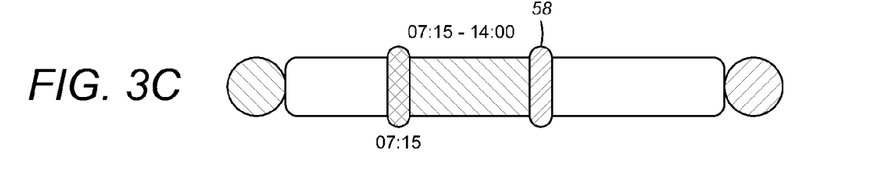

After entering the first time, the user completes the entry of the first time range 52 by entering a second time. The user enters the second time by touching on the stop region 50 and sliding to the desired location on the time bar 42. As described above, other methods may be practiced and the term "touch-and-slide" includes all of these.

When the user initially touches the stop region 50, the device 12 displays a second time marker 58. The device 12 displays the time range display 66. The time range display 66 shows the first time range 52 numerically. FIG. 3C illustrates the interface 16 during the setting process. As the user slides to the desired location, the device 12 displays the marker 58 tracking the slide input and displays the time range 52 contracting. The time range display 66 is periodically updated. When the user reaches the desired location, the user places the marker 58 by releasing the touch. The user can place the marker 58 at any location on the time bar 42. The device 12 displays the marker 58 in a different color to indicate that the marker is placed and removes the time range display 66 from the interface 16. The device 12 displays time indicia 64(*b*) below the marker 58 to show the second time. In this instance, the user has selected the second time of 14:00 for the first time range 52. The interface 16 appears as in FIG. 3D.

The user enters additional time ranges in a similar manner. The user initiates the entry of the second time range 54 by entering a third time. The user touches the start region 48 and slides to the desired location on the time bar 42. The user can select any time that is not within a previously defined time range. When the user touches the start region 48, the device 12 displays a third time marker 60 and a second time range 54 extending from the marker 60 to the right end 46 of the time bar 42. The device 12 displays the time range display 66 to show the time range 54 numerically. As the user slides to the desired location, the device 12 displays the third time marker 60 tracking the slide input and periodically updates the time range display 66. FIG. 3E illustrates the interface 16 during the setting process. When the user reaches the desired location, the user can place the third time marker 60 by releasing the touch. The device 12 displays the third time marker 60 in a different color upon placement. The device 12 removes the time range display 66 from the interface 16. The device 12 displays the time indicia 64(*c*) below the third time marker 60 to show the third time. In this instance, the user has selected the third time of 16:00 for the second time range 54.

After entering the third time, the user completes the entry of the second time range by entering a fourth time. The user enters the fourth time by touching on the stop region 50 and sliding to the desired location on the time bar 42. When the user initially touches the stop region 50, the device 12 displays the fourth time marker 62. The device 12 displays the time range display 66 to show the second time range 54 numerically. As the user slides to the desired location, the device 12 displays the fourth time marker 62 tracking the slide input and periodically updates the time range display 66. FIG. 3F illustrates the interface 16 during the setting process. When the user reaches the desired location, the user places the marker 62 by releasing the touch. The user can place the marker 62 at any location on the time bar 42 that does not cause the second time range 54 to be coincident with or overlap a previously defined time range. The device 12 displays the marker 62 in a different color to indicate that the marker 62 is placed. The device 12 removes the time range display 66 from the interface 16. The device 12 displays the time indicia 64(*d*) below the marker 62 to show the second end time. In this instance, the user has selected the fourth time of 19:00 for the second time range 54. The interface 16 appears as in FIG. 3G.

Editing Time Ranges and Swapping End Regions

Figure 4A:
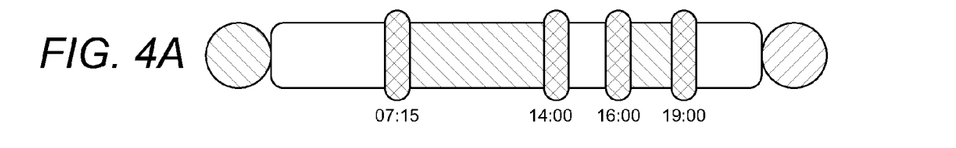
FIG. 4A-4D are displays used by the input device of FIG. 2A for editing time ranges and swapping time markers on time ranges.
Figure 4B:
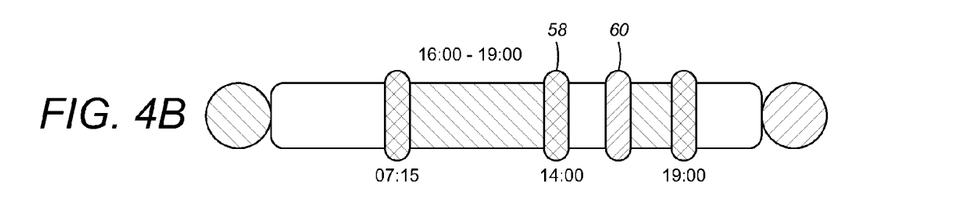
Figure 4C:
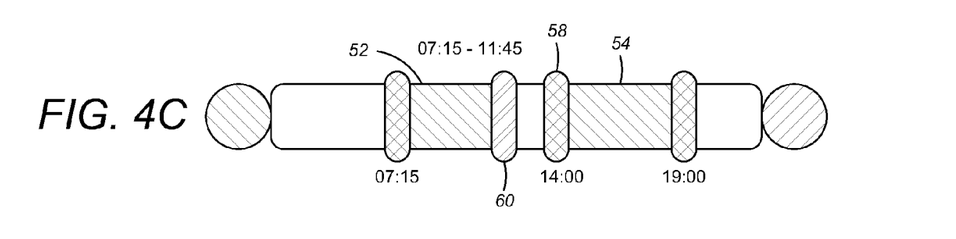

FIG. 4A-4C illustrate the method of editing a previously defined time range, and the method of swapping time markers of two adjacent time ranges.

The user edits an end time of a previously defined time range by touching and sliding the associated marker. For example, the user initiates changing the third time of the second time range by touching the third time marker 60. Upon receiving a touch, the interface 40 displays the marker 60 in a different color to show that it has been selected as shown in FIG. 4B. The device 12 displays the time range display 66 above the time bar 42. The time range display 66 shows the second time range 54 numerically. The user slides the marker 60 to a new location corresponding to a new third time. The device 12 displays the marker 60 tracking the slide input and periodically updates the time range display 66. When the user reaches the desired time, the user places the marker 60 by releasing the touch. The user can place the marker 60 at any location on the time bar 42 such that the time range 54 is not coincident with or overlapping another previously defined time range. The device 12 displays the marker 60 in a different color to indicate that it has been placed and removes the time range display 66 from the interface 16. The device 12 displays the time indicia 64(c) below the marker 60.

Figure 4D:
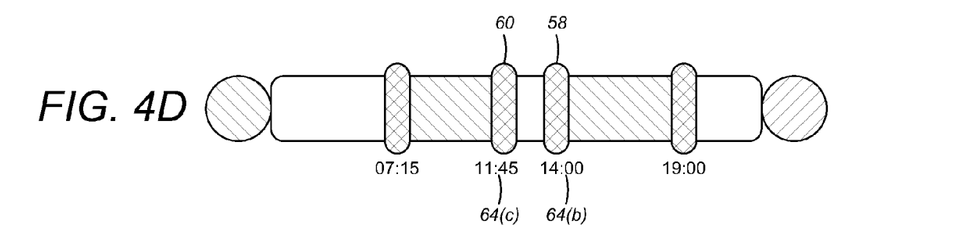

FIGS. 4B-4D illustrate swapping time markers from adjacent previously defined time ranges. The user can swap time markers by touching a time marker and sliding it such that it crosses over an adjacent time marker associated with an adjacent time range. FIG. 4B shows the marker 60 when the user has selected it as described in the editing method described above. The user slides the marker 60 to the left on the time bar 42 until it crosses over the adjacent marker 58. If the user continues to slide the marker 60 to the left, the marker 60 becomes the second marker for time range 52. The marker 58 becomes the third marker 58 for time range 54. The time range display 66 switches from showing the second time range as shown in FIG. 4B, to showing the first time range 52 as shown in FIG. 4C.

Following the swap procedure, the user can continue to slide the marker 60, effectively changing the first time range 52. When the user reaches the desired location, the user places the marker 60 by releasing the touch. The device 12 displays the marker 60 in a different color upon placement. The device 12 removes the time range display 66 from the interface 16 and display the time indicia 64(c) below the marker 60. In this case, the user has selected an end time of 11:45 for the first time range 52 as shown in FIG. 4D.

Merging Time Ranges

FIG. 5A-5E are displays used by the input device of FIG. 2A for merging time ranges. The user merges two previously defined time ranges into one time range by selecting a time marker as described above and superimposing it on an adjacent time marker from a corresponding adjacent time range. This procedure is described in detail below.

Figures 5, 5E:
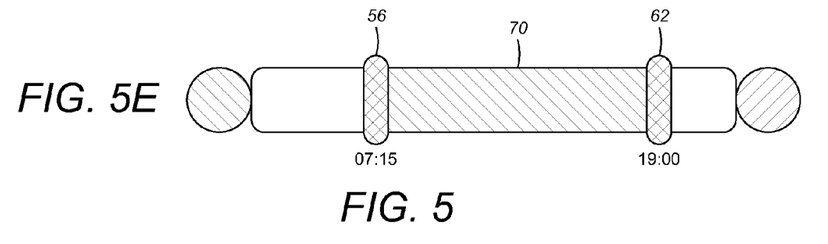
FIG. 5A-5E are displays used by the input device of FIG. 2A for merging time ranges.
Figure 5A:
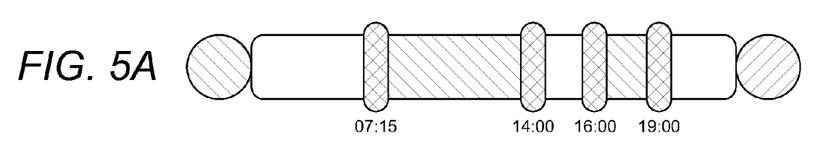
Figure 5B:
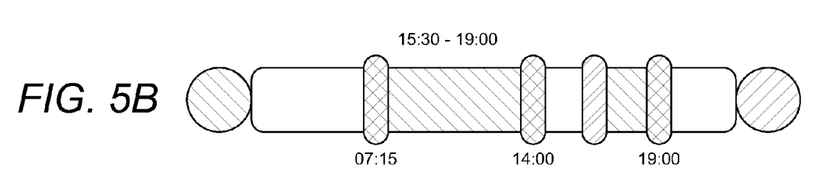
Figure 5C:
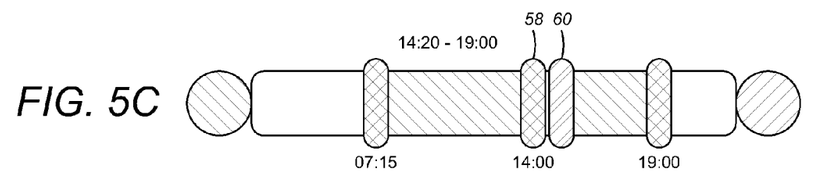
Figure 5D:
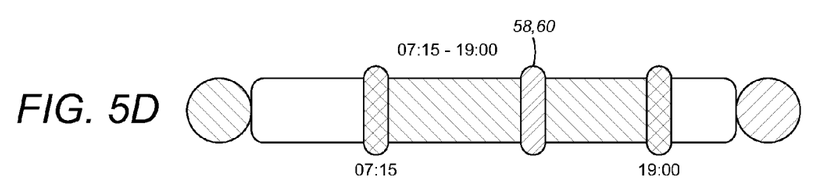

FIG. 5B-5D illustrate the user selecting the third time marker 60, sliding it towards and superimposing it on the second time marker 58. The user initiates the merge by touching the first time marker 60. The device 12 displays the marker 60 in a different color to show that it has been selected. The device 12 displays the time range display 66 above the time bar 42. The time range display 66 displays the time range 54 numerically as shown in FIG. 5B. In order to merge the time ranges, the user slides the marker 60 towards the first time marker 58 as shown in FIG. 5C. The user superimposes the marker 60 on the marker 58 as shown in FIG. 5D. The time range display 66 displays the time range for the merged time windows 52 and 54. If the user releases the touch when the markers 58 and 60 are superimposed, the device 12 removes the second time marker 58 and third time marker 60 from the interface 16. The device 12 displays a single time range 70, extending from the first time marker 56 to the second time marker 62. This is illustrated in FIG. 5E.

Display Options

The description above describes one set of display options for the user interface 16. The description is not limiting, and many other sets of display options are possible. The time markers can be displayed in any suitable shape that facilitates selection on a touchscreen display. The markers can be displayed in one color when selected and another color when not selected as described above. The markers can also be displayed in one shape when selected and in another shape when not selected. It is also possible to show the markers in the same color in the selected and unselected states. It is possible to show the time markers after placement at a location, but not to show the time markers during a slide and touch input. It is possible to display a time range after placement of the two associated end markers, but not to display the time range during the input process. The time range can be differentiated from the time bar by using a different color, or by using a different shape. For example, a time range can be displayed as extending above or below the time bar, or simply with an outline. The time range display can show the time range that is being changed numerically, or the time of the marker that is currently being input or edited. It is also possible not to display a time range display during the input or edit process. Time indicia can be used to display the time of placed time markers. They can also be omitted. Many other display variations are possible.

System Operation

Figure 6:
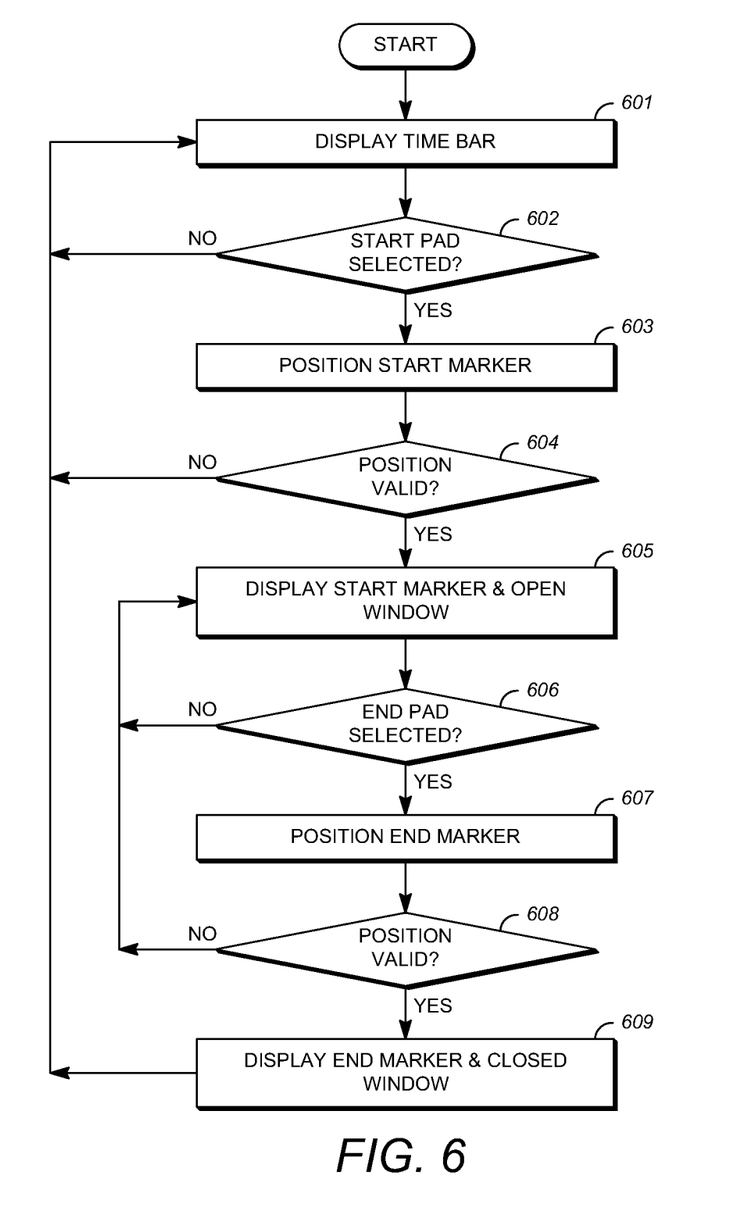
FIG. 6 is a flowchart showing an exemplary process for entering time ranges.

The flow chart in FIG. 6 shows an exemplary process for entering time ranges and is described in connection with FIGS. 3A-3G.

In step 601, the device 12 displays the time bar 42. The time bar includes the right end 44, the left end 46, the start region 48 and the stop region 50.

In step 602, a determination is made whether a touch input is received on the start region 48. If no touch input is received on the start region 48, the process proceeds to step 601 and continues to display the time bar 48. Steps 601 and 602 are repeated periodically until a touch input is received on the start region 48. Upon receipt of a touch input on the time bar, the device initiates entry of a first time marker 56. It can display the first time marker 56 at the start region as shown in FIG. 3A. The device proceeds to step 603.

In step 603, the device tracks the slide input of the user to a first selected location on the time bar 42. The device displays the first marker 56 tracking the slide input to the first selected location.

Upon release of the slide input from the user, the process proceeds to step 604. The device 12 determines the validity of the first selected location. The first selected location is not valid if the first selected location is occupied by a previously defined time range. In this case, the marker entry fails. The process returns to step 601 and displays the time bar. Steps 601 and 602 are performed periodically until another touch input is received on the start region 48.

If, in step 604, the first selected location for the marker is on the time bar 48 at a location not occupied by a previously defined time range, the first selected location is valid. The process proceeds to step 605.

In step 605, the device 12 displays the marker 56 at the first selected location. The device 12 also displays a time range 52 extending from the marker 56 to the right end 46 of the time bar 42. The interface appears as in FIG. 3B.

In step 606, a determination is made whether a touch input is received on the stop region 50. If no touch input is received on the stop region 48, the process proceeds to step 605 and continues to display the time bar 48 including the marker 56 and the time range 52. Steps 606 and 607 are repeated periodically until a touch input is received on the stop region 50. Upon receipt of a touch input on the stop region 50, the device initiates entry of a second time marker 58. The device 12 displays the second time marker 58 at the stop region. The device 12 defines the time range 54 between the first time marker 56 and the second time marker 58. The process proceeds to step 607.

In step 607, the device 12 tracks the slide input of the user to a second selected location on the time bar 42. The device displays the second time marker 58 tracking the slide input to the second selected location.

Upon release of the slide input from the user, the process proceeds step 608. The device 12 determines the validity of the second selected location. The second selected location is not valid if the second selected location is at a location such that the time range 54 is coincident with or overlaps a previously defined time range. In this case, the marker entry fails. The process returns to step 605 and displays the time bar 42, the first time marker 56 and time range 54. Steps 605 and 606 are performed periodically until another touch input is received on the stop region 48.

If, in step 608, the selected location for the second time marker 58 is at a location such that the time range 54 is not coincident with or overlapping a previously defined time range, the selected location is valid. The process proceeds to step 609.

Figure 3D:
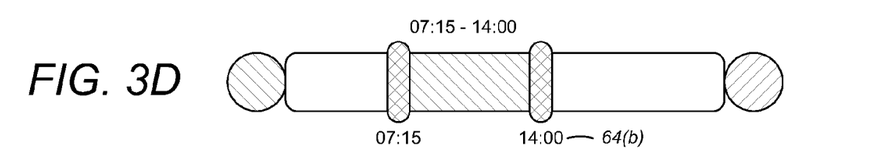
Figure 3E:
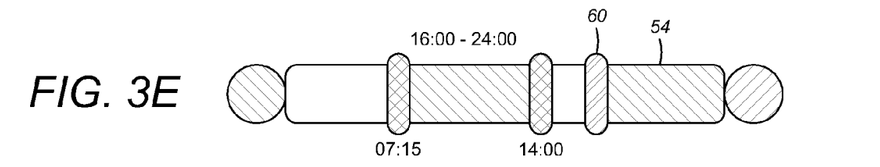
Figure 3F:
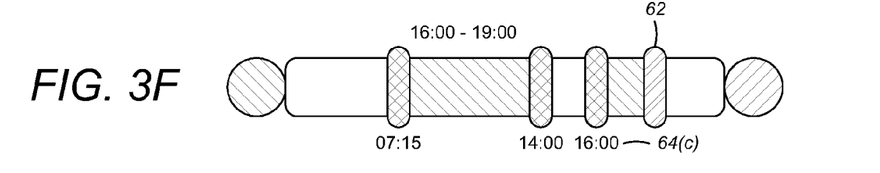
Figure 3G:
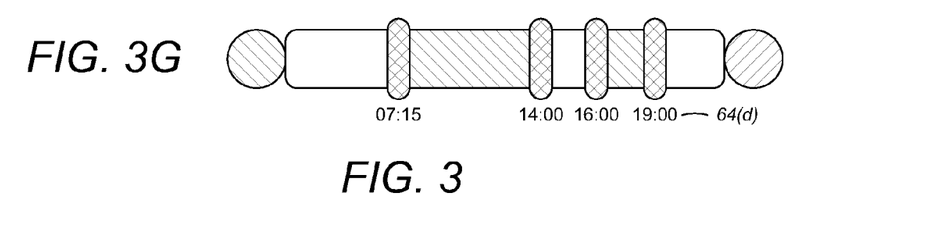

Step 609 is illustrated in FIG. 3D. The time range 54 is fully defined. The device 12 displays the second time marker 58 at the selected location and the time range 54 extending from the first time marker 56 to the second time marker 58. The process proceeds to step 601. The device displays the time bar 42 including the time range 54. The process repeats the steps 601 and 602 until the receipt of a next touch on the start region 48. Additional time ranges can be entered in a similar manner.

Implementation

Figure 7:
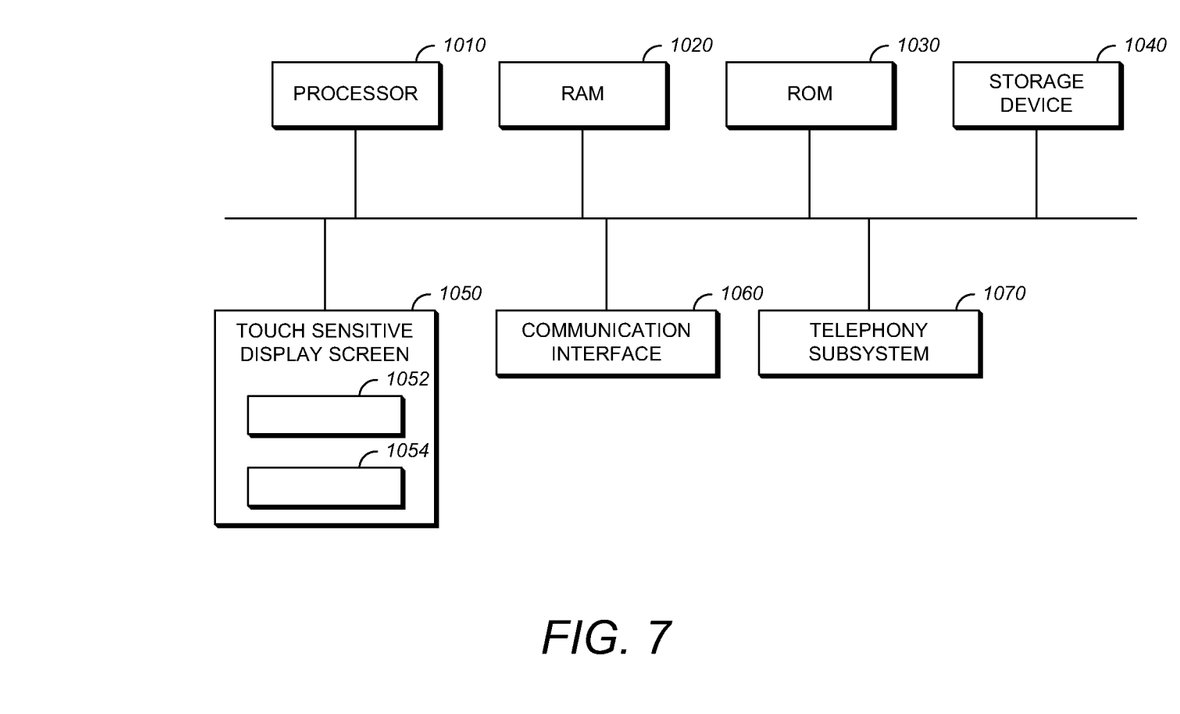
FIG. 7 is a block diagram showing a conventional mobile device including a touch sensitive display screen.

The mobile device 12 with a touch sensitive display screen 14 can be implemented in the form of a conventional cellular telephone 1000 as shown in FIG. 7. The cellular telephone 1000 includes a processor such as a central processing unit (CPU) 1010 and memory such as RAM 1020 and ROM 1030. A storage device 1040 can be provided in the form of any suitable computer readable medium, such as a hard disk drive. A touch sensitive display screen 1050 operates as both an input and a display device. A communications interface 1060 is any manner of wired or wireless means of communication that is operable to send and receive data or other signals using a network. A telephony subsystem 1070 provides functions necessary for placing and receiving telephone calls. The CPU 1010, the RAM 1020, the ROM 1030, the storage device 1040, the touch sensitive display screen 1050, the communications interface 1060, and the telephony subsystem 1070 are all connected to one another by a bus 1080.

The touch sensitive display screen 1050 can be implemented using, for example a capacitive touch display screen as developed by Optrex Corporation for the mobile phone industry. Any suitable structures now known or later devised can be employed as the touch sensitive display screen 1050. Exemplary technologies that can be employed to generate a touch signal include resistive touch sensing, surface acoustic wave touch sensing, capacitive touch sensing, and other suitable technologies. References to objects (such as time displays and markers) being "at" a location on the touchscreen should be understood as meaning at or near (e.g., within reasonable proximity to the location so as to be visually associated with the location).

As an example, the touch sensitive display screen 1050 can include a touchscreen 1052 that is positioned on top of a display 1054. The touchscreen 1052 can be approximately the same size as the display 1054 such that the touchable area of the touchscreen 1052 and the viewable area of the display 1054 are substantially coextensive. In this example, the touchscreen 1052 is a capacitive touchscreen. Other technologies can be employed, as previously noted. In this example, the display 1054 is a liquid crystal display that is operable to display images in response to a video signal.

The client-server 30 can be implemented individually or in any combination in the form of software suitable for performing the processes detailed herein that is executed by a separate conventional computer. As an example, the computer includes a processor such as a central processing unit (CPU) and memory such as RAM and ROM. A storage device can be provided in the form of any suitable computer readable medium, such as a hard disk drive. One or more input devices, such as a keyboard and mouse, a touchscreen interface, etc., allow user input to be provided to the CPU. A display, such as a liquid crystal display (LCD) or cathode ray tube (CRT), allows output to be presented to the user. A communications interface is a manner of wired or wireless means of communication that is operable to send and receive data or other signals using a network. The CPU, the RAM, the ROM, the storage device, the input devices, the display and the communications interface are all connected to one another by a bus.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

The invention claimed is:

1. A method for accepting user input of a plurality of time ranges into a computing device having a touchscreen, comprising:
    displaying on the touchscreen a time bar having a start region, a stop region and a spatial range intermediate the start region and the stop region;
    receiving on the touchscreen a first touch-and-slide input commencing at the start region and terminating at a first location in the spatial range;
    receiving on the touchscreen a second touch-and-slide input commencing at the stop region and terminating at a second location in the spatial range;
    displaying on the touchscreen an indication of a first time range extending from a first time defined based on to a position of the first location in the spatial range to a second time defined based on a position of the second location in the spatial range;

receiving on the touchscreen a third touch-and-slide input commencing at the start region and terminating at a third location in the spatial range;

receiving on the touchscreen a fourth touch-and-slide input commencing at the stop region and terminating at a fourth location in the spatial range; and displaying on the touchscreen an indication of a second time range extending from a third time defined based on a position of the third location in the spatial range to a fourth time defined based on a position of the fourth location in the spatial range, wherein the second time range does not overlap the first time range.

2. The method of claim 1, wherein the first time precedes the second time.

3. The method of claim 1, wherein the spatial range corresponds to a temporal range.

4. The method of claim 1, further comprising:

displaying a time marker in proximity to the start region upon commencement of the first touch-and-slide input; and animating the display of the time marker so that the time marker tracks the first touch-and-slide input to the first location.

5. The method of claim 1, further comprising:

displaying a numeric display of the first time range in proximity to the time bar during the first touch-and-slide input;

identifying an interim location within the spatial range of the first touch-and-slide input;

identifying an interim time based on the position of the interim location relative to the start region; and updating the numeric display of the first time range to display the interim time.

6. The method of claim 1, further comprising:

displaying a numeric display of the first time range in proximity to the time bar during the first touch-and-slide input, the numeric display of the first time range including a displayed start time and a displayed end time;

identifying an interim location within the spatial range of the first touch-and-slide input;

identifying an interim time based on the position of the interim location relative to the start region; and updating the numeric display of the first time range so that the displayed start time is the interim time.

7. The method of claim 6, wherein the time bar is associated with a day and the displayed start time is initially set to a beginning of the day.

8. The method of claim 1, further comprising:

displaying a first time marker at the first location and a second time marker at the second location, wherein the first time marker and second time marker are of a size sufficiently large to facilitate selection by the user on a touchscreen.

9. The method of claim 1, further comprising:

displaying the first time numerically near the first location; and displaying the second time numerically near the second location.

10. The method of claim 1, further comprising:

displaying a portion of the spatial range outside the first time range in a first color; and displaying the first time range in a second color that is different from the first color.

11. The method of claim 1, further comprising:

receiving on the touchscreen a fifth touch-and-slide input commencing at one of the first location or the second location and terminating at a fifth location on the spatial range;

updating one of the first time or the second time based on the position of the fifth location within the spatial range; and updating the first time range to include the updated one of the first time or the second time.

12. The method of claim 1, further comprising:

displaying on the touchscreen a first time marker at the third location; and displaying on the touchscreen a second time marker at the fourth location.

13. The method of claim 1, further comprising:

receiving on the touchscreen a fifth touch-and-slide input commencing at the second location time marker and terminating at the third location; and updating the first time range to include the first time and the fourth time.

14. The method of claim 1, further comprising:

receiving on the touchscreen a fifth touch-and-slide input commencing at the second location and terminating at a fifth location that is intermediate to the third and fourth locations;

updating the first time range to include the first time and the third time; and updating the second time range to include the second time and the fourth time.

15. A method for accepting user input of a plurality of time ranges into a computing device having a touchscreen, comprising:

displaying on the touchscreen a time bar having a start region, a stop region and a spatial range intermediate the start region and the stop region, the spatial range corresponding to a temporal range;

receiving on the touchscreen a first touch-and-slide input commencing at the start region and terminating at a first location in the spatial range;

displaying on the touchscreen a first time marker at the first location;

receiving on the touchscreen a second touch-and-slide input commencing at the stop region and terminating at a second location in the spatial range;

displaying on the touchscreen a second time marker at the second location;

identifying a first time based on the position of the first location within the spatial range;

identifying a second time based on the position of the second location within the spatial range, wherein the first time precedes the second time;

identifying a first time range including the first time and the second time;

receiving on the touchscreen a third touch-and-slide input commencing at the start region and terminating at a third location on the spatial range;

displaying on the touchscreen a third time marker at the third location;

receiving on the touchscreen a fourth touch-and-slide input commencing at the stop region and terminating at a fourth location in the spatial range;

displaying on the touchscreen a fourth time marker at the fourth location;

identifying a third time based on the position of the third location within the spatial range;

identifying a fourth time based on the position of the fourth location within the spatial range; and identifying a second time range including the third time and the fourth time, wherein the second time range is outside of the first time range.

16. The method of claim 15, further comprising:

displaying a portion of the spatial range outside the first time range in a base color; and displaying the first time range in a color that is different from the base color.

17. An apparatus for inputting a plurality of time ranges, comprising:

a touchscreen, a processor in communication with the touchscreen and configured to:

output, for display at the touchscreen, a time bar having a start region, a stop region and a spatial range intermediate the start region and the stop region;

receive an indication of a first touch-and-slide input detected at the touchscreen, the first touch-and-slide input commencing at the start region and terminating at a first location in the spatial range;

receive an indication of a second touch-and-slide input detected at the touchscreen, the second touch-and-slide input commencing at the stop region and terminating at a second location in the spatial range;

output, for display at the touchscreen, a time range extending from a first time defined based on a position of the first location in the spatial range to a second time defined based on a position of the second location in the spatial range;

receive an indication of a third touch-and-slide input detected at the touchscreen, the third touch-and-slide input commencing at the start region and terminating at a third location in the spatial range;

receive an indication of a fourth touch-and-slide input detected at the touchscreen, the fourth touch-and-slide input commencing at the stop region and terminating at a fourth location in the spatial range; and output, for display at the touchscreen, a second time range extending from a third time defined based on a position of the third location in the spatial range to a fourth time defined based on a position of the fourth location in the spatial range, wherein the second time range does not overlap the first time range.

18. The apparatus of claim 17, wherein the processor is further configured to output, for display at the touchscreen, a first time marker at the first location and a second time marker at the second location, and wherein the first time marker and the second time marker are of a size sufficiently large to facilitate selection by a user on the touchscreen.

19. The apparatus of claim 17, wherein the processor is further configured to:

output, for display at the touchscreen, a portion of the spatial range outside the first time range in a base color; and output, for display at the touchscreen, the first time range in a color that is different from the base color.

20. The apparatus of claim 17, wherein the processor is further configured to:

output, for display at the touchscreen, a time marker in proximity to the start region upon commencement of the first touch-and-slide input; and output, for display at the touchscreen, movement of the time marker so that the time marker tracks the first touch-and-slide input to the first location.

\* \* \* \* \*